United States Patent
Nitschke

(10) Patent No.: US 6,327,917 B1
(45) Date of Patent: Dec. 11, 2001

(54) DEVICE FOR DETECTING A PRESSURE EXERTED UPON THE SEAT OF A MOTOR VEHICLE

(75) Inventor: Werner Nitschke, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/486,791

(22) PCT Filed: Jul. 3, 1999

(86) PCT No.: PCT/DE99/02052
§ 371 Date: May 8, 2000
§ 102(e) Date: May 8, 2000

(87) PCT Pub. No.: WO00/01552
PCT Pub. Date: Jan. 13, 2000

(30) Foreign Application Priority Data

Jul. 6, 1998 (DE) .............................................. 198 30 104

(51) Int. Cl.$^7$ ...................................................... G01D 7/00
(52) U.S. Cl. ...................................................... 73/862.041
(58) Field of Search ....................... 73/862.041, 867.042, 73/862.043, 862.044, 862.045, 862.046

(56) References Cited

U.S. PATENT DOCUMENTS

| | | | | |
|---|---|---|---|---|
| 4,059,909 | * | 11/1977 | Kron ...................................... | 35/12 E |
| 4,467,252 | * | 8/1984 | Takeda et al. ......................... | 318/603 |
| 4,655,505 | * | 4/1987 | Kashiwamura et al. .............. | 297/284 |
| 4,722,550 | * | 2/1988 | Imaoka et al. ........................ | 280/727 |
| 5,263,765 | * | 11/1993 | Nagashima et al. ................. | 297/284.6 |
| 5,848,661 | * | 12/1998 | Fu ......................................... | 180/273 |
| 6,055,473 | * | 4/2000 | Zwolinski et al. ..................... | 701/49 |

* cited by examiner

Primary Examiner—Max Noori
(74) Attorney, Agent, or Firm—Michael J. Striker

(57) ABSTRACT

A device for detecting a pressure exerted on a vehicle seat, having sensors (16) mounted on at least one seat element, and a control unit (14) connected to the sensors (16) and detecting signals output by the sensors (16). It is proposed that it be at least some of the sensors (16) are disposed outside the seat region (26) that is in direct contact with the body of the passenger.

13 Claims, 3 Drawing Sheets

DEVICE FOR DETECTING A PRESSURE EXERTED UPON THE SEAT OF A MOTOR VEHICLE

PRIOR ART

The invention relates to a device for detecting a pressure exerted on a vehicle seat.

Such devices are increasingly being used in automotive engineering to provide opportunities of detecting whether and how heavily a seat is occupied. Especially in vehicles of the most expensive class, these detection devices are used because a number of different functions that enhance safety and comfort can be coupled with them.

These include among others fundamental safety functions that are actuated or tripped in a different way depending on the load exerted by a passenger on the seat. German Patent Disclosure DE 196 15 321 mentions as one option tripping an airbag in different ways depending on occupation of the seat. It is detected whether an adult or a child or child seat is located on the vehicle seat. Still other safety devices, such as belt tighteners or rollbar systems are controlled with pressure-sensor elements integrated with the seat.

It is also conventional for special seat adjusting functions and seat associated safety functions to be controlled via the pressure exerted passively on the seat by a passenger. One such system is described in German Patent Disclosure DE 43 39 113, in which along with a headrest adjustment and securing of a child with respect to back seat doors and windows, still other functions are named such as lighting and air conditioning functions, which can be selected as a function of the load exerted on the seat.

All of these seat occupation detecting devices based on mechanical or nonmechanical operative principles have in common the fact that the functions coupled with them are tripped passively by the passenger or the driver, or in other words simply by a person taking a seat in the vehicle. Active tripping of these or other functions is possible only if additional switches are mounted on the dashboard or on the vehicle door.

ADVANTAGES OF THE INVENTION

The device according to the invention for detecting a pressure exerted on a vehicle seat has the advantage that at least some of the sensors for pressure detection are disposed outside the seat region that is in direct contact with the body of the passenger. Thus all the vehicle functions that in conventional seat occupation detection are actuated solely passively can be varied actively with a set of pressure sensors. Switches for activating seat adjustment processes, as functions associated directly with the seat, can in this way be integrated very elegantly, and in a way that is comfortable for the passenger, with the vehicle seat.

Various options exist in terms of the choice of certain sensor types for use in seat occupation detection. Along with sensors based on a mechanical operative principle, such as micromechanical switches, sensors on an electrical or magnetic basis are also conceivable. The only decisive factor is that the sensors used react to external pressure.

If the seat occupation detection in a vehicle is integrated with a seat foil disposed beneath a seat region, then it is advantageous if the sensors outside the seat region that is in direct with the body of the passenger also be integrated with this foil. This not only offers the advantage of an extremely shallow embodiment but above all has cost advantages, because the manufacture of a larger seat foil with more pressure sensors does not entail any significant additional expense. Detecting and evaluating the additional pressure pulses via an already existing control unit is again not a problem that entails material costs; they can readily be implemented in the form of additional program routines.

It is also advantageous if the sensors outside the aforementioned seat region are disposed side-by-side on the edge of a seating surface. This makes for an arrangement on the order of a switch panel, which the driver or the passenger can access conveniently and in targeted way.

In order to detect the regions of the pressure sensors that located beneath the seat region, it is advantageous if these regions have a marking. The symbols are then selected such that it can be seen clearly which functions can be actuated with which pressure sensor. Colored foils whose direction indicates the appropriate adjusting direction, or symbols that can also be aesthetically harmonized with the overall appearance of the seat are examples of suitable ways to mark these locations.

By integrating the switches required for adjusting the seat with the seat foil, additional switches that would have to be mounted and wired individually can be dispensed with. This not only reduces the effort of assembly but also creates a system less vulnerable to malfunction, because many contacts and soldering points are omitted. The electronics that are part of the seat adjustment can also be integrated with the already existing seat occupation electronics, which overall leads to a considerable reduction in cost.

If a sensor located outside the aforementioned seat region is connected to a latch of a child seat mounting, then a child seat detection can be performed as a further seat-associated function. This means that the information as to whether or not there is a child seat on the vehicle seat and whether or not the child seat is snapped into the mounting can be sent to the control unit via a pressure sensor and displayed accordingly. This information is especially relevant for the sake of differentiated airbag tripping.

Another advantageous variant provides that the belt lock status detection be performed via the pressure sensors integrated with the seat foil. Thus this information as well can be ascertained with a device of the invention and also displayed.

A very simple way of making the connection between the child seat mounting and the belt lock with the pressure-sensitive regions of the seat foil is to use mechanical devices, such as levers or bolts, by way of which the pressure is transmitted.

DRAWING

One exemplary embodiment of a device according to the invention is shown in the drawing and explained in further detail in the ensuing description.

DESCRIPTION OF THE EXEMPLARY EMBODIMENT

Figure 1:
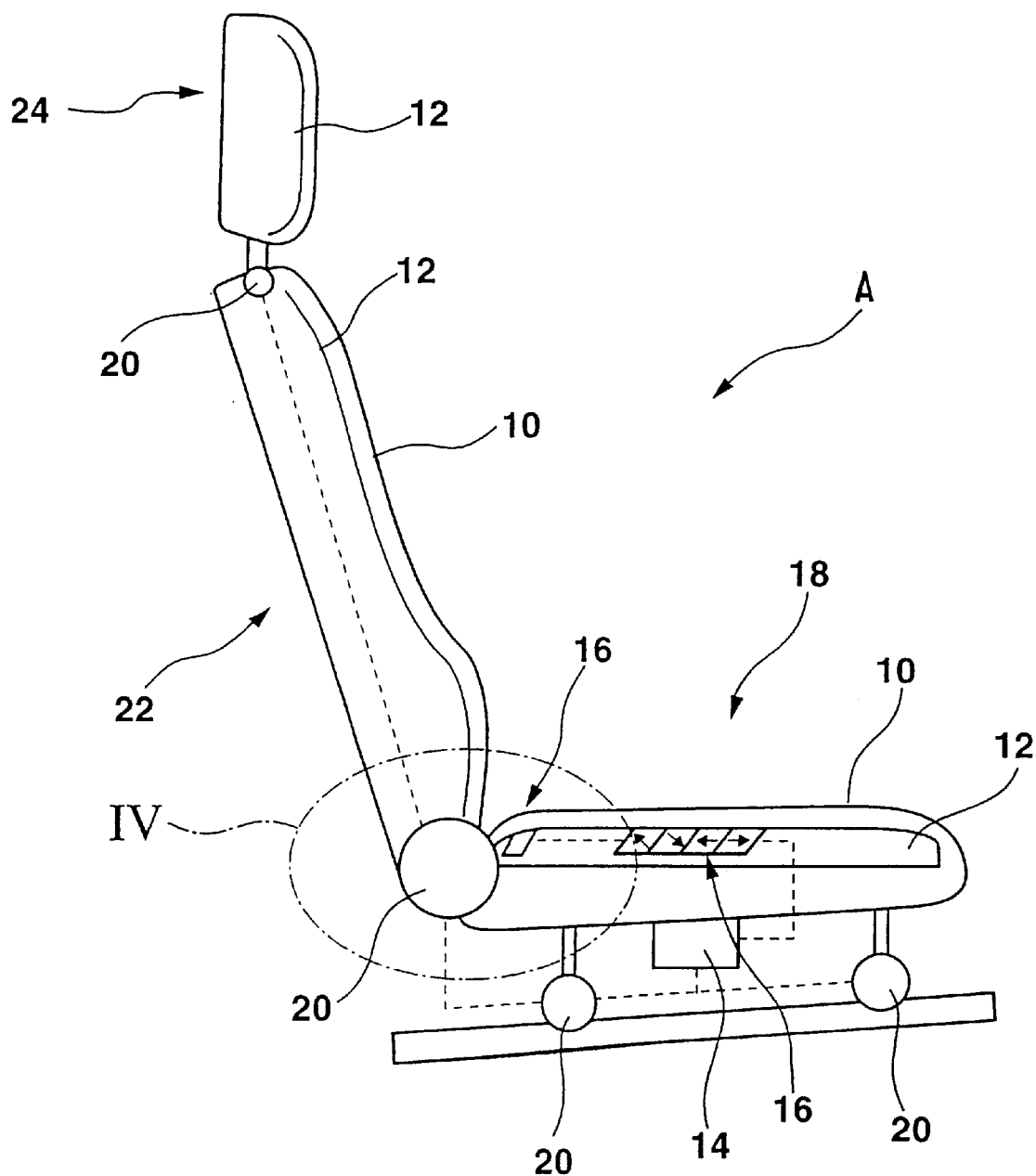
FIG. 1 shows a seat in the exemplary embodiment from the side.

The exemplary embodiment shown in FIG. 1 of a device according to the invention has a typical vehicle seat, under whose upholstery 10 a seat foil 12 is disposed. This seat foil 12 is a two-ply foil approximately 1 mm thick. The first ply has pressure-sensitive regions, whose electrical resistance alters as a function of pressure. The second ply is located beneath it and has conductor tracks mounted on it which carry the pressure information on to a control unit 14. The pressure-sensitive regions on the seat foil are the sensors 16. These sensors 16, in the exemplary embodiment of FIG. 1, are disposed at the edge of a seating surface 18.

Important adjustments of the seat can be performed automatically with the drive means 20. In the exemplary embodiment shown, these are the longitudinal and height-wise adjustment of the vehicle seat, the adjustment of the inclination of a seat back 22, and the height adjustment of a headrest 24. The drive means 20 are typically small electric motors, but drive means on a pneumatic or hydraulic basis can also be used.

Figure 2:
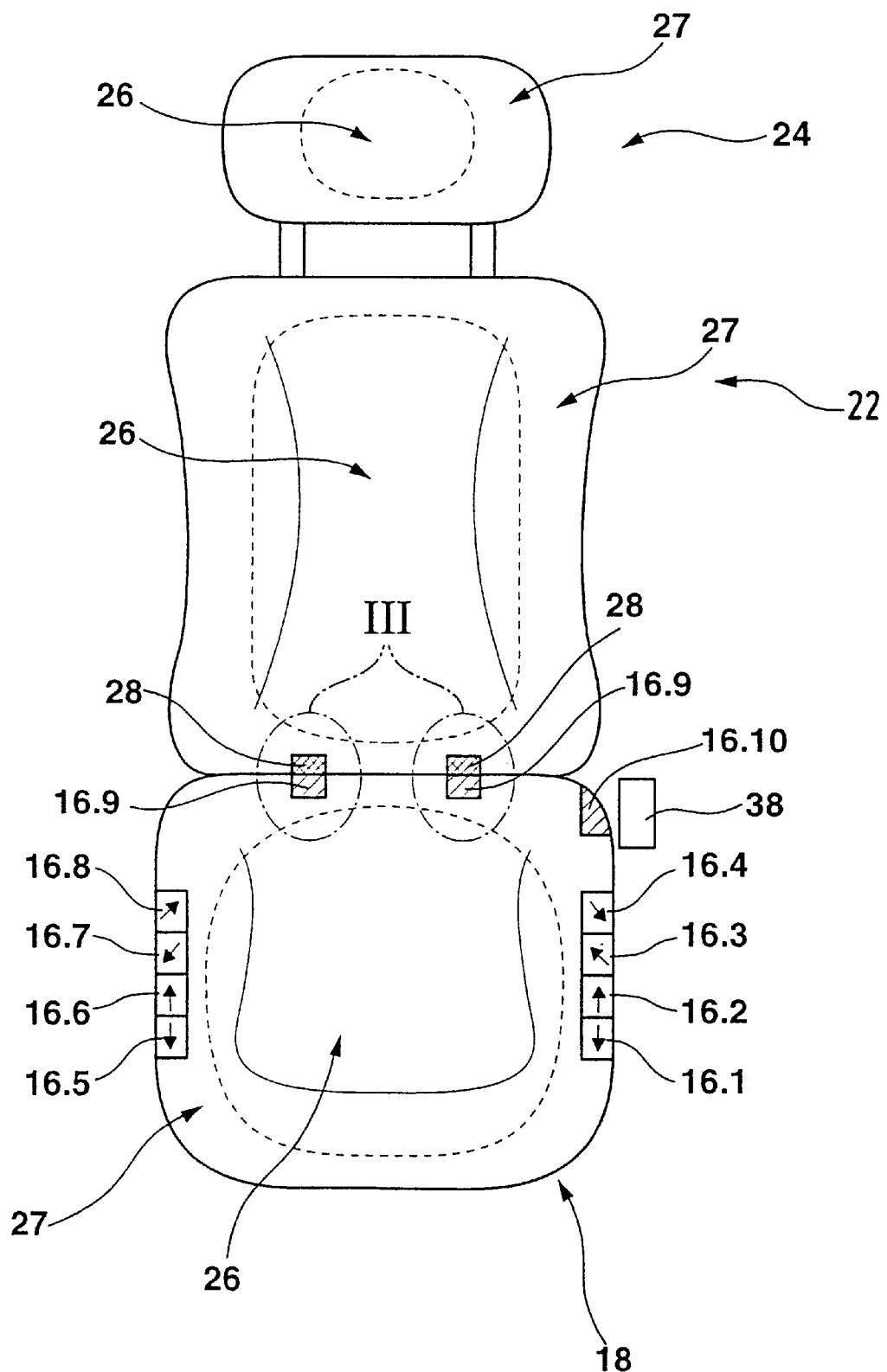
FIG. 2 shows the seat from above in the direction of the arrow A in FIG. 1.

FIG. 2 shows a view of the vehicle seat in the direction of the arrow A in FIG. 1. Here, just as in all the later drawing Figs., identical characteristics are identified by the same reference numerals. The seat foil 12 is no longer explicitly shown in FIG. 2 but covers the seating surface 18 virtually completely, as well as the region shown of the backrest 22 and the headrest 24.

Each of the different seat elements can be subdivided into two regions, separated from one another by dashed lines. The enclosed surfaces 26 represent the seat region that is in direct contact with the body of the passenger. The remaining surfaces are designated as the regions 27 outside the seat region that is in direct contact with the body of the passenger.

Outside the surface 26, four points each are marked on the left and right edges of the seating surface 18; the sensors 16.1 through 16.8 for seat adjustment are located beneath these points. By active pressure on the points marked with arrows, a longitudinal adjustment of the seat can be performed in this exemplary embodiment with the sensors 16.1 and 16.2. With the sensors 16.3 and 16.4 located directly behind them, the height adjustment of the vehicle seat is performed. The four sensors 16.5 and 16.6 located side by side on the left edge of the seating surface 20 are used to adjust the inclination of the seat back 22, and with the sensors 16.7 and 16.8, the headrest 24 can be adjusted in height.

Two further sensors 16.9 are placed in the rear region of the seating surface 18, likewise outside the surface 26, and they are in contact with two latches 28 of a child seat.

Figure 3:
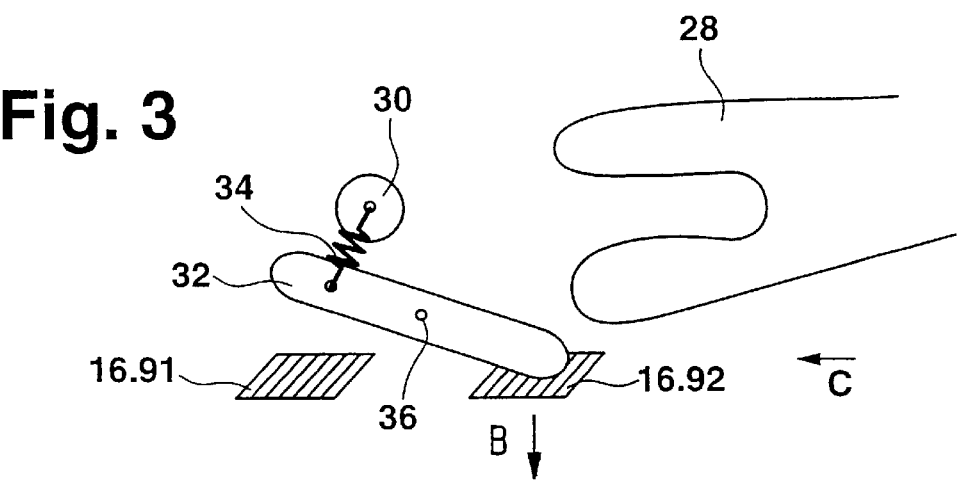
FIGS. 3 and 4 show the regions III in FIG. 2 in two different states, from the side.
Figure 4:
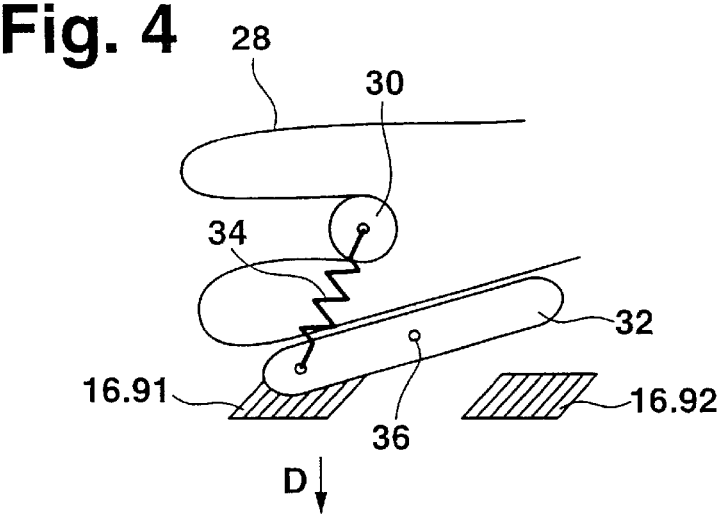

FIGS. 3 and 4 show one option for detecting a child seat. The latch 28 of the child seat is shaped such that it can snap into a counterpart 30 mounted on the vehicle seat and connects the two parts securely together. The form of the latch 28 also enables an actuation of a lever 32, which is connected to the counterpart 30 via a spring 34. The hinge point 36 of the lever 32 is located approximately in the middle above the sensors 16.91 and 16.92. If the latch 28—as shown in FIG. 3—is not in contact with the counterpoint 30, then the lever 32, dictated by the force of the spring 34, presses on the sensor 16.92 and loads it (arrow B). No pressure is exerted on the sensor 16.91. If the latch 28 of the child seat is moved in the direction of the arrow C and made to snap into the counterpart 30, then the lever 32 is pressed in a direction that loads the sensor 16.91 (arrow d) and simultaneously relieves the sensor 16.92. It can thus be reliably detected whether the child seat is fastened as described, or not. Another factor is that each of the two states of the child seat is characterized by two unequivocal sensor states, thus providing a redundant statement, as needed for safety systems, about the status of the child seat.

Figure 5:
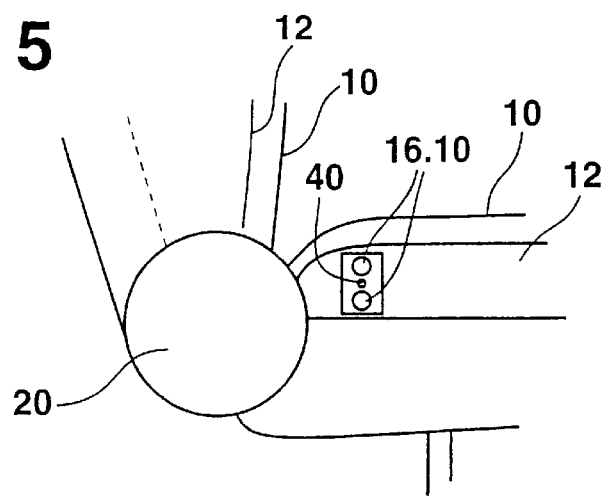
FIG. 5 shows an enlarged detail of the region IV in FIG. 1.

An analogous status detection can be performed with the sensor 16.10, which is located in the immediate vicinity of a belt lock 38, again via mechanical devices. Once again, levers are appropriate, whose hinge points 40—as shown in FIG. 5—are located in the middle above two pressure points 16.10. Once again, a redundant statement about the status of the belt lock is thus obtained.

What is claimed is:

1. A device for detecting a pressure exerted on a vehicle seat, comprising a plurality of sensors mounted on at least one seat element having a seat region which is in direct contact with a body of a passenger and a seat region which has no contact with a body of a passenger; a control unit connected to said sensors and detecting signal output of said sensors, at least some of said sensors being disposed outside the seat region which is in direct contact with a body of a passenger and in the seat region which has no contact with the body of a passenger, so that said at least some sensors have no contact with a body of a passenger, and a location in a seat upholstery, below which said at least some sensors are located, having markings.

2. A device as defined in claim 1, wherein said sensors are sensors which alter their electrical resistance as a function of a pressure exerted on said sensors.

3. A device as defined in claim 1, wherein; and further comprising a seat foil located underneath the seat upholstery, said sensors are integrated in the seat foil located underneath the seat upholstery.

4. A device as defined in claim 1, wherein the sensors located outside the seat region are disposed side-by-side on an edge of a seating surface.

5. A device as defined in claim 1; and further comprising drive means enabling an adjustment of individual seat elements, said control unit being connected to said drive means.

6. A device as defined in claim 1, wherein at least one of said sensors located outside the seat region is connected to a latch.

7. A device as defined in claim 1, wherein at least one of said sensors is connected to a latch of a child seat via mechanical devices.

8. A device as defined in claim 7, wherein said at least one sensor is connected to the latch of the child seat by mechanical devices formed as devices selected from the group consisting of levers and bolts.

9. A device as defined in claim 1, wherein at least one of said sensors located outside the seat region is connected to a belt lock.

10. A device as defined in claim 8, wherein said at least one sensor is connected to the belt lock by mechanical devices.

11. A device as defined in claim 10, wherein said at least one sensor is connected to the belt lock via a mechanical devices formed as devices selected from the group consisting of levers and bolts.

12. A device for detecting a pressure exerted on a vehicle seat, comprising a plurality of sensors mounted on at least one seat element having a seat region which is in direct contact with a body of a passenger and a seat region which has no contact with a body of a passenger; a latch for a child seat; and control unit connected to said sensors and detecting signal output of said sensors, at least some of sensors being disposed outside the seat region that is in direct contact with a body of the passenger and in the seat region which has no contact with a body of a passenger, at least one of said sensors located outside the seat region that is in direct contact with a body of the passenger being connected to said latch so as to provide a child seat status detection.

13. A device for detecting a pressure exerted on a vehicle seat, comprising a plurality of sensors mounted on at least one seat element having a seat region which is in direct contact with a body of a passenger and a seat region which has no contact with a body of a passenger; a belt lock; and control unit connected to said sensors and detecting signal output of said sensors, at least some of sensors being disposed outside a seat region that is in direct contact with a body of the passenger and in the seat region which has no contact with a body of a passenger at least one of said sensors located outside the seat region that is in direct contact with a body of the passenger being connected to said belt lock so as to provide a belt lock status detection.

* * * * *